A. DE CLAIRMONT.
TRANSMISSION LOCK FOR MOTOR VEHICLES.
APPLICATION FILED SEPT. 21, 1920.
1,398,455.
Patented Nov. 29, 1921.
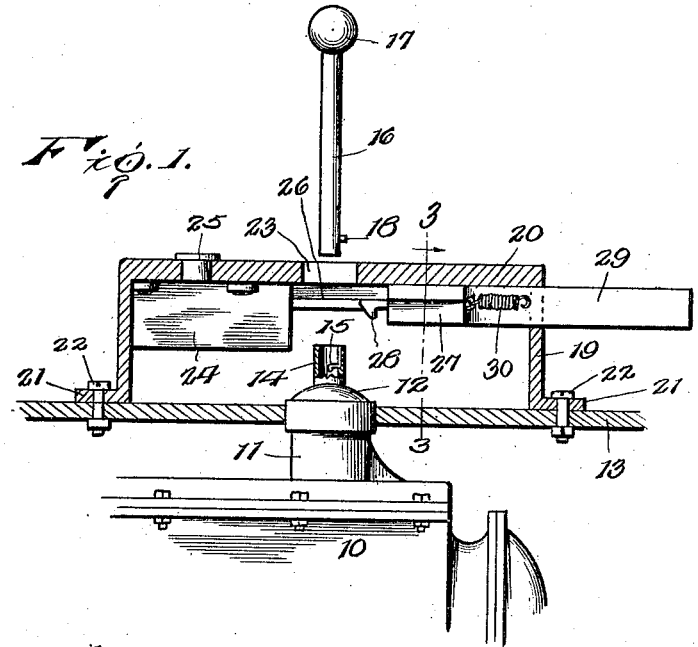
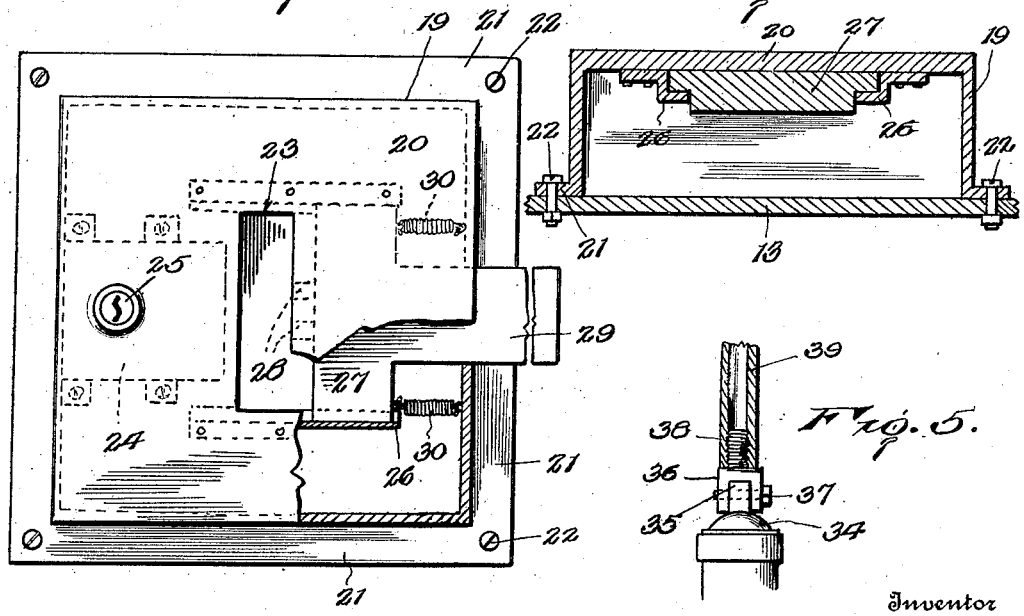
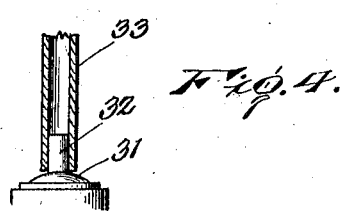
Inventor
A. de Clairmont.
By
Lacey & Lacey, Attorneys

UNITED STATES PATENT OFFICE.

ADOLFO DE CLAIRMONT, OF TOLEDO, OHIO.

TRANSMISSION-LOCK FOR MOTOR-VEHICLES.

1,398,455.  Specification of Letters Patent.  Patented Nov. 29, 1921.

Application filed September 21, 1920. Serial No. 411,800.

*To all whom it may concern:*

Be it known that I, ADOLFO DE CLAIRMONT, a citizen of the United States, residing at Toledo, in the county of Lucas and State of Ohio, have invented certain new and useful Improvements in Transmission-Locks for Motor-Vehicles, of which the following is a specification.

This invention relates to an improved transmission lock for motor vehicles and has as one of its principal objects to provide a device of this character which will be characterized by structural simplicity and which will, at the same time, effectually prevent unauthorized use of a vehicle equipped therewith.

A further object of the invention is to provide a device wherein the shank of the transmission control lever above the ball joint thereof may not only be removed but wherein means will be provided for preventing access to said joint so as to avoid engagement of a substitute lever with the joint for shifting the gears.

And the invention has as a still further object to provide a device which may be readily employed in connection with substantially any conventional design of transmission gear as now in common use.

Other and incidental objects will appear hereinafter.

In the drawings:

Figure 1 is a sectional view showing my improved device in conjunction with a transmission gear set of conventional design, only the gear case being illustrated, however, Fig. 2 is a plan view particularly illustrating the casing employed, parts being broken away and shown in section, Fig. 3 is a transverse sectional view on the line 3—3 of Fig. 1, looking in the direction of the arrows, Fig. 4 is a detail view showing a slight modification, and Fig. 5 is a detail showing a further slight modification.

Referring now more particularly to the drawings, I have shown my improved lock in connection with a motor vehicle gear set of conventional design. However, since the particular construction and mounting of the gears themselves do not concern the present invention, they have not been illustrated. The case of the gear set is indicated at 10 and projecting upwardly from said case is the usual socket 11 in which is mounted a ball 12 providing a joint for the control lever employed. Below the joint the lever is formed in the customary manner whereby the lever may be manipulated for shifting the gears. As is usual, the socket 11 extends upwardly through the floor 13 of the vehicle.

In carrying the invention into effect, I form upon the ball 12 an upstanding tubular socket 14 provided in its wall with a bayonet slot 15 and removably engageable at its lower end in said socket is a lever shank 16. At its upper end this shank is provided with the usual ball 17 while upon the lower end of the shank is formed a lug 18 engageable in the slot 15 of the socket. Consequently, as will be appreciated, the shank may be inserted in the socket and locked therein when, of course, the shank of the lever may be manipulated for shifting the transmission gears. Mounted upon the floor 13 of the vehicle to overlie the ball joint of the lever is a substantially rectangular casing 19 having side and end walls and a thickened top wall 20 which is flat. The casing is open at its lower end and the side and end walls thereof are provided with lateral flanges 21 through which are engaged bolts or other approved fastening devices 22 extending through the floor 13 for permanently securing the casing thereto. Formed in the top wall 20 of the casing is an oblong door opening 23 disposed above the ball 12 and secured within the casing at one side of said opening is a lock 24. This lock may be of any approved type and is preferably provided with a barrel 25 extending up through the top wall of the casing so that a key may be readily inserted in the lock for actuating said lock. Secured to the lower face of the top wall 20 of the casing at opposite ends of the door opening 23 are, as particularly shown in Fig. 3, parallel cleats 26 and slidably supported by said cleats immediately beneath said wall is a substantially T-shaped door 27. Projecting from the forward edge of the door are spaced catch bolts 28 adapted to coact with the lock 24 and extending from the rear edge of the door medially thereof is a rearwardly directed extension or arm 29 projecting freely through the adjacent side wall of the casing. Suitably secured at their forward ends to the rear edge of the door at opposite sides of said extension are contractile springs 30, the opposite ends of which are appropriately fastened to the adjacent side wall of the casing so that said springs will normally act to hold the door open lying at one side of the door opening 23. However, as will be appreciated, by pushing upon the extension 29 the door may be readily shifted to closed position when the catch bolts 28 will ride into the lock to be engaged thereby so that the door will be secured closed.

As will now be readily understood in view of the preceding description, when it is desired to operate the vehicle, a key may be inserted in the lock 24 and the door 27 released so that the lever shank 16 may be engaged in the socket 14 of the ball 12. The lever may then be freely moved for shifting the speed gears. On the other hand, on leaving the vehicle, the operator may detach the lever shank 16 and close the door, carrying the lever shank away. Access to the ball 12 of the lever will then be prevented. However, even should the door be broken open or the casing 19 displaced, a person intending to steal the vehicle would still be without practical means to engage in the socket 14 whereby shifting of the gears might be effected. I accordingly provide a very efficient lock and, as will now be seen, a device which may be readily employed in connection with a gear set of substantially any conventional design.

In Fig. 4, I have illustrated a slight modification of the invention. In this modification, the ball 31 of the control lever is formed with an upstanding stud 32 while the lever shank 33 is of tubular construction so that the lower end of said shank may simply be slidably fitted over said stud for connecting the shank with the ball.

In Fig. 5 I have illustrated a further modification wherein the ball 34 of the lever is, as in the prior modification, provided with a stud 35. However, in this modification, a yoke 36 is employed. The yoke is secured to the stud 35 by a pin 37 and formed on the yoke is a threaded stud 38. A tubular lever shank 39 is provided and, at its lower end, this shank is internally threaded to engage the stud 38. As will be seen, this modified structure also provides an arrangement whereby the lever shank may be conveniently connected with the ball.

Having thus described the invention, what is claimed as new is:

1. The combination with a gear set, and a casing therefor, of a control lever for the gear set, a ball joint supporting the lever upon the casing, the lever being provided above the joint with a detachable shank, a casing overlying the joint and having a door opening through which said shank may be inserted to coact with the joint, and a door upon the casing for closing said opening.

2. The combination with a gear set, of a control lever therefor having a ball joint, a shank above the ball, means detachably connecting said shank with the ball, a casing overlying the ball and provided with a door opening through which said shank may extend in operative position, a door slidable within the casing for closing said opening, and yieldable means normally holding the door open.

3. The combination with a gear set, of a control lever therefor having a ball joint, a shank above the ball, means detachably connecting said shank with the ball, a casing overlying the ball and provided with a door opening through which said shank may extend in operative position, a door slidable within the casing for closing said opening, the door being provided with an extension projecting through a wall of the casing and engageable for closing the door, and yieldable means normally holding the door open.

4. The combination with a gear set, of a control lever therefor having a ball joint, a shank above the joint, means detachably connecting said shank with the ball, a casing overlying the ball and provided with a door opening through which said shank may extend in operative position, a lock mounted within the casing at one side of the door opening, and a door slidable within the casing to a position closing said opening engaged by the lock.

5. The combination with a gear set, of a control lever therefor having a joint and provided above the joint with a detachable shank, a casing overlying the joint and provided with a door opening through which said shank may extend in operative position, and a door shiftable within the casing for closing said opening, the door being provided with an extension projecting through a wall of the casing and engageable for operating the door.

In testimony whereof I affix my signature.

ADOLFO de CLAIRMONT. [L. S.]